(12) United States Patent
Kwon et al.

(10) Patent No.: US 9,727,474 B2
(45) Date of Patent: Aug. 8, 2017

(54) TEXTURE CACHE MEMORY SYSTEM OF NON-BLOCKING FOR TEXTURE MAPPING PIPELINE AND OPERATION METHOD OF TEXTURE CACHE MEMORY

(71) Applicants: SAMSUNG ELECTRONICS CO., LTD., Suwon (KR); INDUSTRY & ACADEMIC COOPERATION GROUP OF SEJONG UNIVERSITY, Seoul (KR)

(72) Inventors: Kwon Taek Kwon, Seoul (KR); Youngsik Kim, Seoul (KR); Woo Chan Park, Seoul (KR); Young Duke Seo, Seoul (KR); Sang Oak Woo, Anyang (KR); Seok Yoon Jung, Seoul (KR); Duk Ki Hong, Seongnam (KR)

(73) Assignees: Samsung Electronics Co., Ltd., Suwon-si (KR); INDUSTRY & ACADEMIC COOPERATION GROUP AT SEJONG UNIVERSITY, Seoul (KR)

( * ) Notice: Subject to any disclaimer, the term of this patent is extended or adjusted under 35 U.S.C. 154(b) by 19 days.

(21) Appl. No.: 13/966,889

(22) Filed: Aug. 14, 2013

(65) Prior Publication Data
US 2014/0244939 A1    Aug. 28, 2014

(30) Foreign Application Priority Data

Feb. 28, 2013  (KR) .................. 10-2013-0021872

(51) Int. Cl.
*G09G 5/36* (2006.01)
*G06F 12/0875* (2016.01)
*G06F 12/0855* (2016.01)

(52) U.S. Cl.
CPC ...... *G06F 12/0875* (2013.01); *G06F 12/0855* (2013.01)

(58) Field of Classification Search
CPC ............... G06F 12/0855; G06T 15/04; G09G 2360/121
See application file for complete search history.

(56) References Cited

U.S. PATENT DOCUMENTS

| 5,526,510 A | 6/1996 | Akkary et al. |
| 6,085,292 A | 7/2000 | McCormack et al. |
| 6,914,610 B2 * | 7/2005 | Lavelle et al. ................ 345/581 |

(Continued)

FOREIGN PATENT DOCUMENTS

| JP | 2011-8773 | 1/2011 |
| KR | 10-2004-0037183 A | 5/2004 |

*Primary Examiner* — Hau Nguyen
(74) *Attorney, Agent, or Firm* — NSIP Law

(57) ABSTRACT

A non-blocking texture cache memory for a texture mapping pipeline and an operation method of the non-blocking texture cache memory may include: a retry buffer configured to temporarily store result data according to a hit pipeline or a miss pipeline; a retry buffer lookup unit configured to look up the retry buffer in response to a texture request transferred from a processor; a verification unit configured to verify whether result data corresponding to the texture request is stored in the retry buffer as the lookup result; and an output control unit configured to output the stored result data to the processor when the result data corresponding to the texture request is stored as the verification result.

19 Claims, 9 Drawing Sheets

(56) References Cited

U.S. PATENT DOCUMENTS

| | | |
|---|---|---|
| 6,933,945 B2 | 8/2005 | Emberling |
| 7,027,063 B1 * | 4/2006 | Minkin ............................ 345/552 |
| 7,158,141 B2 | 1/2007 | Chung et al. |
| 7,562,205 B1 | 7/2009 | Case et al. |
| 7,565,490 B1 * | 7/2009 | Donham et al. .............. 711/122 |
| 7,777,749 B2 | 8/2010 | Chung et al. |
| 2009/0198972 A1 | 8/2009 | Nystad et al. |

* cited by examiner

<Non-blocking Texture Cache Memory 800>

TEXTURE CACHE MEMORY SYSTEM OF NON-BLOCKING FOR TEXTURE MAPPING PIPELINE AND OPERATION METHOD OF TEXTURE CACHE MEMORY

CROSS-REFERENCE TO RELATED APPLICATIONS

This application claims the priority benefit of Korean Patent Application No. 10-2013-0021872, filed on Feb. 28, 2013, in the Korean Intellectual Property Office, the disclosure of which is incorporated herein by reference.

BACKGROUND

1. Field

Example embodiments of the following disclosure relate to technology that may enhance performance of a non-blocking texture cache memory for a texture mapping pipeline.

2. Description of the Related Art

A non-blocking cache refers to a cache capable of performing a handling operation according to a cache miss when the cache miss occurs, and simultaneously processing consecutive cache accesses.

The non-blocking cache may use an out-of-order process for an execution type, and may use two processes, an out-of-order process and an in-order process for a completion type. The out-of-order process completes an operation in an execution order and thus, overhead may be absent.

Many systems require an in-order completion and thus, there may be some constraints on using the out-of-order process. The in-order completion process may complete an operation in an input order and thus, may be used for all of the systems and also be stable. However, a predetermined method may be required to correct a completion order to match an input order.

Texture mapping that operates based on the out-of-order completion process may cause an issue in the case of applying an alpha blending process or a multi-texturing process and thus, the in-order completion may be required.

SUMMARY

The foregoing and/or other aspects are achieved by providing a non-blocking texture cache memory, including: a retry buffer configured to store result data according to a hit pipeline or a miss pipeline; a retry buffer lookup unit configured to look up the retry buffer in response to a texture request; a verification unit configured to verify whether result data corresponding to the texture request is stored in the retry buffer as the lookup result; and an output control unit configured to output the stored result data when the result data corresponding to the texture request is stored as the verification result.

Further, the retry buffer may temporarily store the result data according to the hit pipeline or the miss pipeline, the texture request may be transferred from a processor, and the output control unit may output the stored result data to the processor The texture cache memory may further include a cache hit/miss determining unit configured to generate a texture address, and to determine whether the texture data corresponding to the texture request is a cache hit or a cache miss when the result data corresponding to the texture result is not stored as the verification result.

The texture cache memory may further include a hit pipeline unit configured to perform a predetermined operation using a predetermined algorithm, and to output the generated result data to the retry buffer when the texture data corresponding to the texture request is the cache hit as the determination result.

The texture cache memory may further include a cache miss processing unit configured to collect cache missed texture data from an external memory, and to output the collected cache missed texture data to the retry buffer when the texture data corresponding to the texture request is the cache miss as the determination result.

The cache miss processing unit may include a waiting list buffer configured to include an entry, and to store, in the entry, a texture request in which the cache miss occurs.

When processing of the texture request stored in the entry is completed, the waiting list buffer may change a state of the processing completed entry to a ready state and may transmit the processed entry to a miss pipeline.

The entry may include at least one of a valid bit, a ready bit, texel data corresponding to each of addresses, and miss request data.

The cache miss processing unit may include a block address log unit configured to verify whether an address requested to an external memory and being processed is present among miss addresses.

When the address requested to the external memory and being processed is absent, the block address log unit may store the received miss address and may enqueue the miss address to request the external memory for the miss address.

The cache miss processing unit may include a miss pipeline unit configured to provide a duplication function of a hit pipeline executed when an entry of a waiting list buffer is in a ready state.

The miss pipeline unit may store texture data to be output in the retry buffer, based on fragment identification information and texture request identification information.

The foregoing and/or other aspects are achieved by providing a non-blocking texture cache memory, including: a texture mapping pipeline unit configured to look up a retry buffer when a texture request is received, and to transfer corresponding texture data to a shading unit when the lookup succeeds; a hit pipeline unit configured to process a hit pipeline using hit texture data, and to store a result of the hit pipeline in the retry buffer when the lookup fails; and a miss pipeline unit configured to request an external memory for missed texture data through a waiting list buffer, to process a miss pipeline using texture data transferred from the external memory, and to store a result of the miss pipeline in the retry buffer.

The foregoing and/or other aspects are achieved by providing an operation method of a non-blocking texture cache memory, the method including: temporarily storing, by a retry buffer, result data according to a hit pipeline or a miss pipeline; looking up, by a retry buffer lookup unit, the retry buffer in response to a texture request transferred from a processor; verifying, by a verification unit, whether result data corresponding to the texture request is stored in the retry buffer as the lookup result; and outputting, by an output control unit, the stored result data to the processor when the result data corresponding to the texture request is stored as the verification result.

The non-blocking texture cache memory operating method may further include generating a texture address, and determining whether the texture data corresponding to the texture request is a cache hit or a cache miss when the result data corresponding to the texture result is not stored as the verification result.

The non-blocking texture cache memory operating method may further performing a predetermined operation using a predetermined algorithm, and outputting the generated result data to the retry buffer when the texture data corresponding to the texture request is the cache hit as the determination result.

The non-blocking texture cache memory operating method may further collecting cache missed texture data from an external memory, and outputting the collected cache missed texture data to the retry buffer when the texture data corresponding to the texture request is the cache miss as the determination result.

According to an example embodiment, the present disclosure may provide an in-order non-blocking texture cache that may divide a pipeline into two portions after referring to a non-blocking texture cache and then may separately process a hit request and a miss request.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
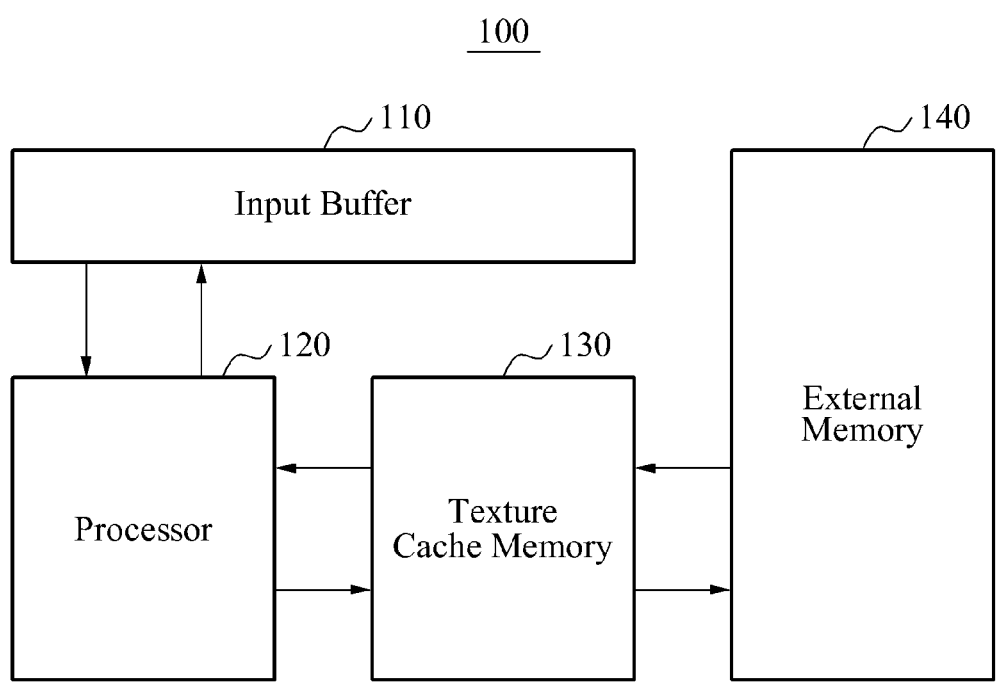
FIG. 1 illustrates a system, which uses a non-blocking texture cache memory, according to an example embodiment.

Reference will now be made in detail to embodiments, examples of which are illustrated in the accompanying drawings, wherein like reference numerals refer to like elements throughout. Embodiments are described below to explain the present disclosure by referring to the figures.

When it is determined that a detailed description relates to a known function or configuration that may make the purpose of the embodiments unnecessarily ambiguous in describing the embodiments that detailed description may be omitted. Also, terminologies used herein are defined to appropriately describe the exemplary embodiments, and thus, may be changed depending on a user, the intent of an operator, or a custom. Accordingly, the terminologies must be defined based on the following overall description of this specification.

FIG. 1 illustrates a system 100, which uses a non-blocking texture cache memory, according to an example embodiment.

Referring to FIG. 1, the system 100 may include an input buffer 110, a processor 120, a texture cache memory 130, and an external memory 140. The system 100 and any of the system's components may include at least one processing device.

The input buffer 110 may transfer input data to the processor 120. The input buffer may transmit and/or receive data to/from the processor 120.

The processor 120 may include at least one functional unit (FU) to perform at least one operation. The processor 120 may process the input data using the at least one FU.

The processor 120 may process the transferred input data using an FU, based on at least one of a regular latency operation process and an irregular latency operation process.

More specifically, the processor 120 may verify input data using an FU, and may determine whether to process the input data using the regular latency operation process or the irregular latency operation process, based on the verification result.

When input data of which operation time is constant at all times, and thus, of which timing calculation may be accurately performed and also of which optimal schedule may be generated, the processor 120 may process the input data using an FU, based on the regular latency operation process.

However, in the case of input data of which operation time is irregular using an FU, the processor 120 may generate a priority schedule by assuming a single latency value for compiling.

The processor 120 may access the texture cache memory 130 in order to use texture data while performing an operation of input data.

The texture cache memory 130 may apply a non-blocking function to a general blocking texture cache.

To this end, the texture cache memory 130 may add a waiting list unit, a miss pipeline, a retry buffer, and a block address log to a texture cache, for example, a blocking texture cache. Further, the texture cache memory 130 may include a functionality of a decoding and conversion unit in order to support various pixel formats of OpenGL. The above-described waiting list unit, miss pipeline, retry buffer, and block address log are examples, and thus, the present disclosure is not limited thereto.

Texture mapping that operates based on an out-of-order process may cause an issue when applying an alpha blending process or a multi-texturing process.

Accordingly, the texture cache memory 130 may effectively process completion based on an in-order process while performing an operation based on the out-of-order process.

For example, the texture cache memory 130 may be an in-order cache memory that may divide a pipeline into two portions and separately process a hit request and a miss request after reference of the non-blocking cache. The hit request may be processed based on the in-order process through a hit pipeline. The miss request may be processed through a miss pipeline. The processing result may be stored in a retry buffer. The result stored in the retry buffer may be referred to again in an order, based on fragment identification (ID) information and texture request ID information.

When the processor 120 accesses the texture cache memory 130, the texture cache memory 130 may search through or verify the retry buffer and verify whether a previous result value is present within the retry buffer.

When the previous result value is present, the texture cache memory 130 may output the previous result value. However, when the previous result value is absent, the texture cache memory 130 may verify the cache hit or the cache miss.

When the cache miss occurs, the texture cache memory 130 may not enter into a stall state.

When the result is absent within the retry buffer, the texture cache memory 130 may refer to a memory through a cache. The texture cache memory 130 may generate an address and may verify whether the generated address is the cache hit or the cache miss, in order to determine a memory address to be accessed. In the case of the cache hit, a value may be present within the cache, and thus, the texture cache memory 130 may output result data present within the cache.

In the case of the cache miss, the texture cache memory 130 may collect texture data from the external memory 140. The texture cache memory 130 may store a list of texture data to be fetched from the waiting list buffer, and may perform other processing instead of entering into the stall state according to the cache miss.

Accordingly, the texture cache memory 130 may collect texture data from the external memory, which may be a dynamic random access memory (DRAM) or a layer 2 (L2) cache, for example. The DRAM and the L2 cache are examples, and thus, the present disclosure is not limited to the external memory being a DRAM or L2 cache.

Data and an algorithm required to configure a three-dimensional (3D) image may be added to the texture cache. In the case of the cache hit, the texture cache memory 130 may output result data by performing an operation on a memory value using the algorithm.

Since the texture cache memory 130 operates based on the in-order completion process, processing based on the out-of-order process occurring in a general non-blocking cache may not be considered. Also, even though a miss request is retried, it is possible to prevent degradation of performance from occurring due to the retry by avoiding cache re-inquiry.

In the case of using the texture cache memory 130, according to an example embodiment, it is possible to enhance the performance by storing result data of a hit request in the retry buffer and enabling the stored result data to be referred to.

Figure 2:
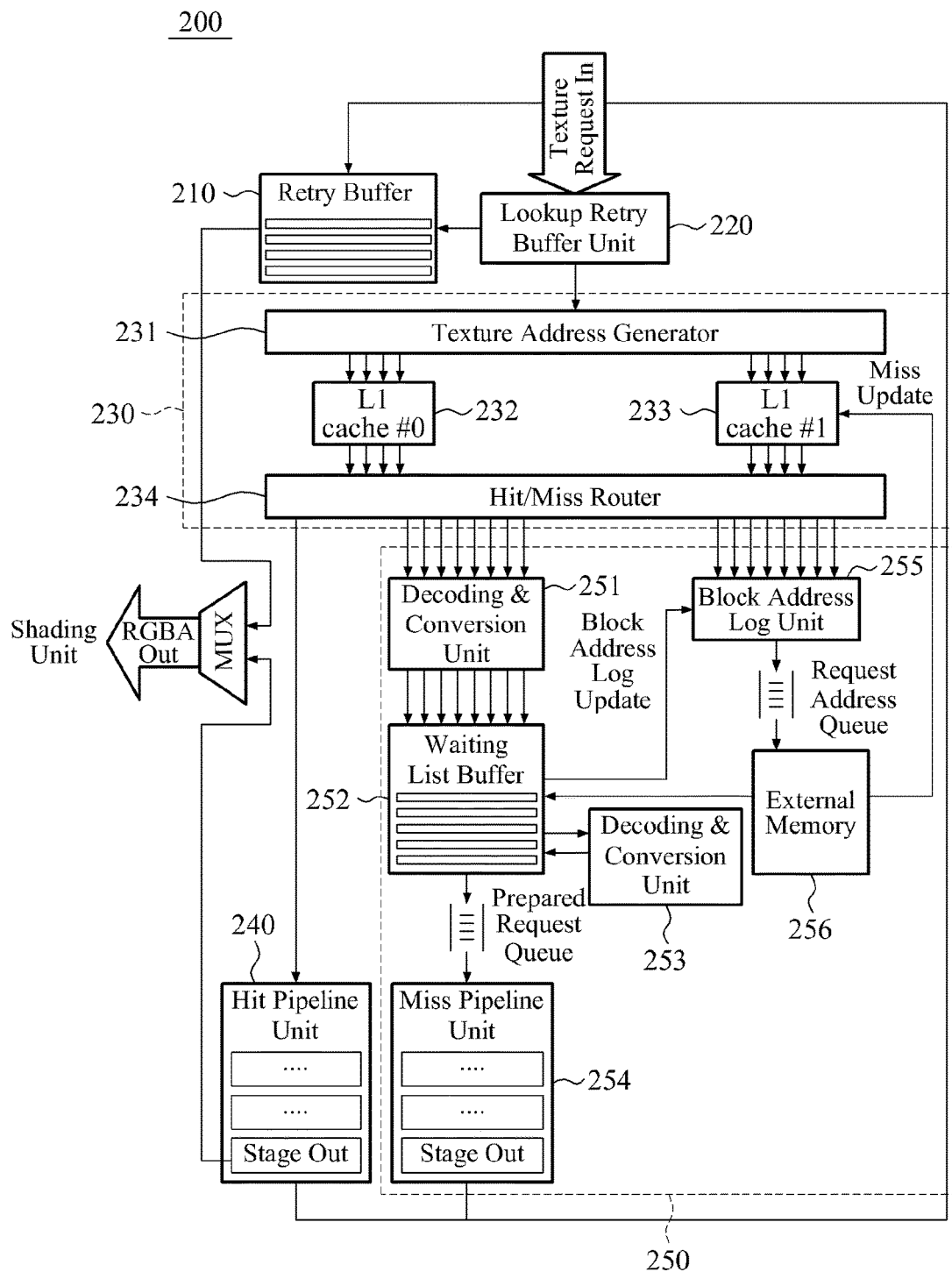
FIG. 2 illustrates a non-blocking texture cache memory, according to an example embodiment.

FIG. 2 illustrates a non-blocking texture cache memory 200, according to an example embodiment.

A processor may access the texture cache memory 200 in order to use texture data while performing an operation on input data.

The texture cache memory 200 may apply a non-blocking function to a general blocking texture cache. The texture cache memory 200 may include at least a retry buffer 210, a lookup retry buffer unit 220, a cache hit/miss determining unit 230, a hit pipeline unit 240, and a cache miss processing unit 250. The above-described components of the texture cache memory 200 are examples, and thus, the present disclosure is not limited thereto.

The retry buffer 210 may temporarily store result data, according to a hit pipeline or a miss pipeline.

A hit request may be sequentially processed through the hit pipeline, and a miss request may be processed through the miss pipeline. The result thereof may be stored in the retry buffer 210.

The result stored in the retry buffer 210 may be referred to again in an order, based on fragment ID information and texture request ID information.

Further, the retry buffer 210 may be updated. In the case of updating the retry buffer 210, the result according to the hit pipeline or the miss pipeline may be stored in an address of corresponding fragment ID information and texture request ID information. For example, the retry buffer 210 may store the result processed based on the out-of-order process, in an existing order.

In response to a texture request transferred from the processor, the lookup retry buffer unit 220 may look up the retry buffer 210.

When the lookup succeeds, for example, when all of the texture requests of a corresponding fragment are ready, movement to a shading unit may be performed together with the corresponding texture data. Accordingly, even though a cache missed texture request is retried, the lookup retry buffer unit 220 may not refer to the texture cache again. When the lookup fails, the lookup retry buffer unit 220 may continue an operation of a texture mapping pipeline.

The texture cache memory 200 may classify a pipeline into the texture mapping pipeline, the hit pipeline, and the miss pipeline. The texture mapping pipeline may include the entire pipeline for processing the texture request. The hit pipeline may include a pipeline after a cache stage in which the hit request is processed. The miss pipeline may include a duplicate pipeline of the hit pipeline for processing the miss request.

The lookup retry buffer unit 220 will be further described with reference to FIG. 3.

Figure 3:
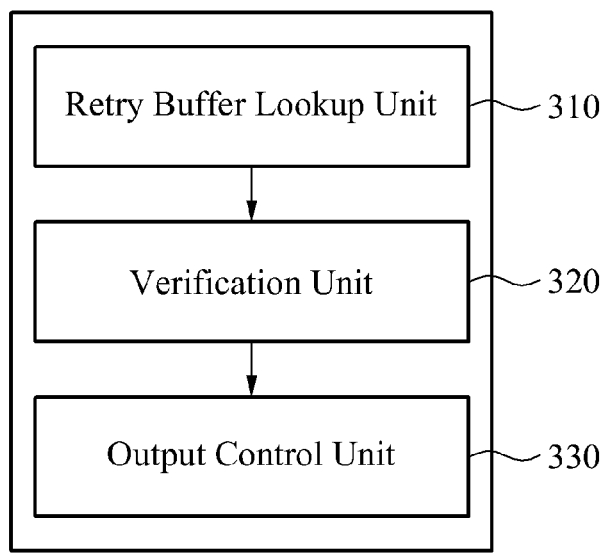
FIG. 3 illustrates a lookup retry buffer unit, according to an example embodiment.

FIG. 3 illustrates a lookup retry buffer unit 300, according to an example embodiment.

When a texture request is transferred from a processor, the lookup retry buffer unit 300 may verify whether a previous result value is present within a retry buffer, prior to determining whether a cache hit or a cache miss is present. When the previous result value is absent, the lookup retry buffer unit 300 may verify whether the cache hit or the cache miss is present, and thereby operate in a hit pipeline in the case of the cache hit, and may operate in a miss pipeline in the case of the cache miss.

The lookup retry buffer unit 300 may include a retry buffer lookup unit 310, a verification unit 320, and an output control unit 330.

In response to the texture request transferred from the processor, the retry buffer lookup unit 310 may look up a retry buffer.

As the lookup result, the verification unit 320 may verify whether result data corresponding to the texture request is stored in the retry buffer.

When the result data corresponding to the texture request is stored, the output control unit 330 may output the stored result data to the processor.

However, when the result data corresponding to the texture request is not stored in the retry buffer, the lookup retry buffer unit 300 may generate a texture address and determine whether the result data corresponding to the texture request is a cache hit or a cache miss using a cache hit/miss determining unit.

When the result data corresponding to the texture request is determined as the cache hit, a hit pipeline unit may perform a predetermined operation using a predetermined algorithm and may output generated result data to the retry buffer.

Referring again to FIG. 2, the cache hit/miss determining unit 230 may operate when the result data corresponding to the texture request is not stored or found after looking up the retry buffer unit.

For example, the cache hit/miss determining unit 230 may determine whether the texture data corresponding to the texture request is the cache hit or the cache miss.

The cache hit/miss determining unit 230 may include a texture address generator 230, L1 cache #0 232, L1 cache #1 233, and a hit/miss router 234.

The texture address generator 231 may generate a texture address to determine whether texture data corresponding to the texture request is the cache hit or the cache miss.

The L1 cache may be divided into two portions, the L1 cache #0 232 and the L1 cache #1 233. For example, the L1 cache #0 232 may include a cache for a lower level of mipmap. The L1 cache #1 233 may include a cache for an upper level of the mipmap.

Nearest neighboring filtering or bilinear filtering, for example, may use only the L1 cache #0 232. Tri-linear filtering, for example, may use the L1 cache #0 232 or the L1 cache #1 233. Four addresses may be simultaneously input into each cache for bilinear filtering. Four outputs may be transferred to a subsequent entity through the hit/miss router 234.

In the case of the cache hit, the hit pipeline unit 240 may perform a predetermined operation using a predetermined algorithm and may output generated result data to the retry buffer 210. Accordingly, the retry buffer 210 may store and update the result data that is output and transferred.

The cache miss processing unit 250 may include a decoding and conversion unit 251, a waiting list buffer 252, a decoding and conversion unit 253, a miss pipeline unit 254, and a block address log unit 255.

Each of the decoding and conversion units 251 and 253 may be a configuration unit to support various pixel formats including, for example, compression of OpenGL in the non-blocking texture cache memory 200.

The waiting list buffer 252 may include entries, and may store a cache missed texture request in each of the entries. Each of the entries may include at least one of a valid bit, a ready bit, texel data corresponding to each of addresses, and miss request data, however, these are examples, and thus, the present example is not limited thereto.

When processing of a texture request stored in an entry is completed, the waiting list buffer 252 may change a state of the processing completed entry to a ready state and transmit the corresponding entry to the miss pipeline.

The miss pipeline unit 254 may provide a duplication function of the hit pipeline executed when the entry of the waiting list buffer 252 is in the ready state.

When the address requested to an external memory 256 and being processed is absent, the block address log unit 255 may store the received miss address and enqueue the miss address to request the external memory 256 for the miss address.

Figure 4:
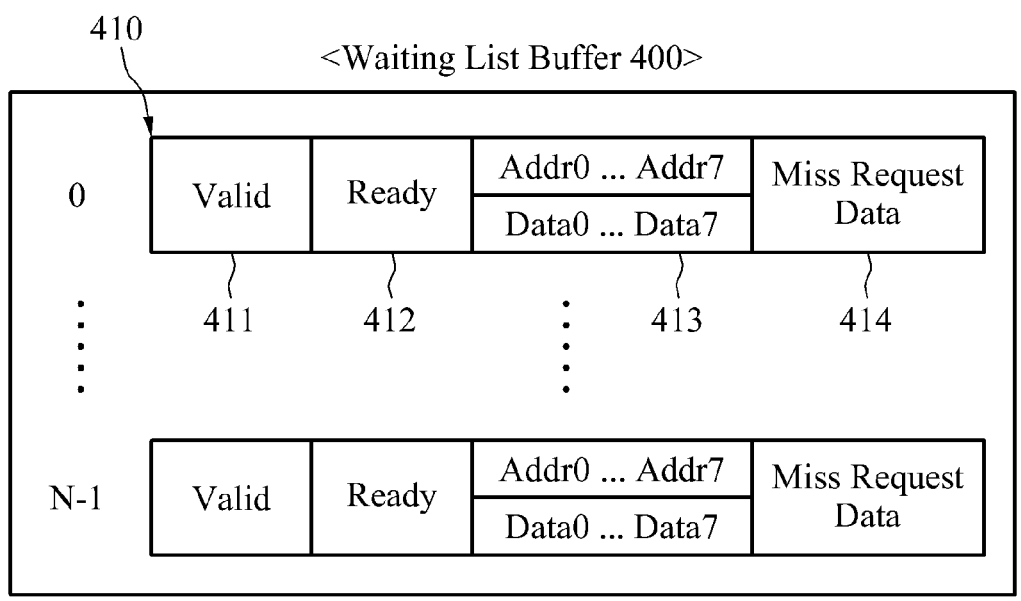
FIG. 4 illustrates a waiting list buffer, according to an example embodiment.

FIG. 4 illustrates a waiting list buffer 400, according to an example embodiment.

The waiting list buffer 400 may store cache missed texture requests. Next, when another request occurs, the waiting list buffer 400 may collect data corresponding to stored texture requests from an external memory.

The waiting list buffer 400 may perform a queuing functionality of storing and managing texture requests, and may store a plurality of entries.

A texture request may include a batch to access a texture cache using one to a maximum of eight addresses based on a filtering mode.

For example, nearest neighborhood filtering may have a single address, bilinear filtering may have four addresses, and tri-linear filtering may have eight addresses. When processing of all of the miss addresses of each entry is completed, a corresponding entry may enter into a ready state and at the same time, the ready entry may be transmitted to the miss pipeline. Referring to FIG. 4, a single entry 410 may include a valid bit 411 indicating validity of the entry 410, a ready bit 412 indicating whether processing of all of the miss addresses of the entry 410 is completed, eight addresses and texel data 413 corresponding thereto, and miss request data 414 including a filtering mode, a pixel format, a lambda, and coordinates (s, t).

The miss request data 414 may include information required until filtering is performed. Word offset may include a portion excluding byte offset 2 bits from the lower log (cache word size)+2 bits of each address.

Figure 5:
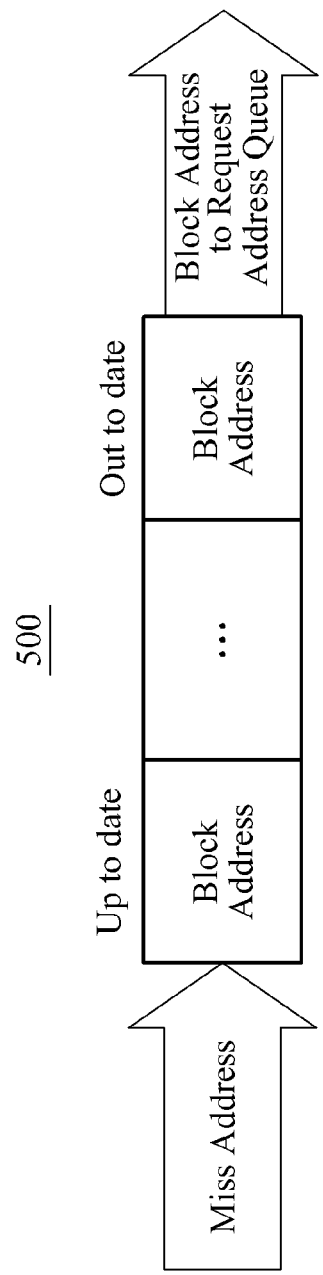
FIG. 5 illustrates a block address log output by a block address log unit, according to an example embodiment.

FIG. 5 illustrates a block address log 500 output by a block address log unit, according to an example embodiment.

The block log address unit may verify whether an address requested to an external memory, such as a DRAM, for example, and being processed is present among miss addresses received, and may use the block address log 500 for the verification.

That is, when the same address as a currently input address is absent within the block address log 500, the currently input address may be stored in the block address log 500 and may be enqueued in a request address queue to make it possible to request the external memory for texture data. The currently input address may be added to the queue of the block address log 500 as an up to date address, as shown in FIG. 5.

Figure 6:
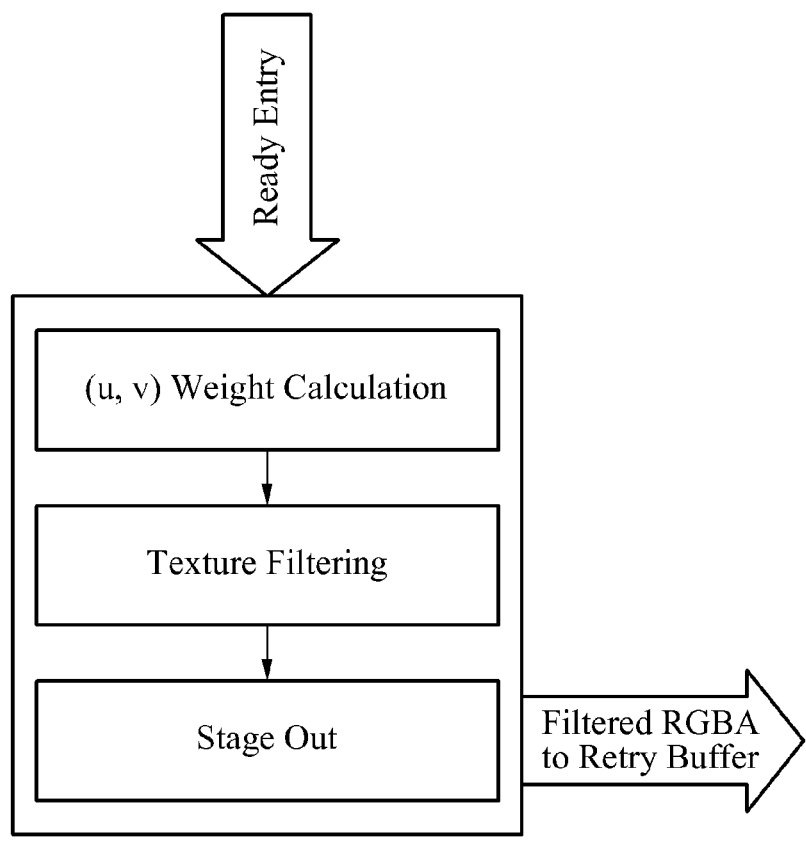
FIG. 6 illustrates a miss pipeline unit, according to an example embodiment.

FIG. 6 illustrates a miss pipeline unit 600, according to an example embodiment.

The miss pipeline unit 600 may include a duplicate pipeline of a hit pipeline executed when an entry of a waiting list buffer is in a ready state. The miss pipeline unit 600 may output data through weight calculation, texture filtering, and stage out, and may store the output data in a retry buffer to match fragment ID information and texture request ID information. As shown in FIG. 6, for example, the filtered RGBA data is output to the retry buffer.

Figure 7:
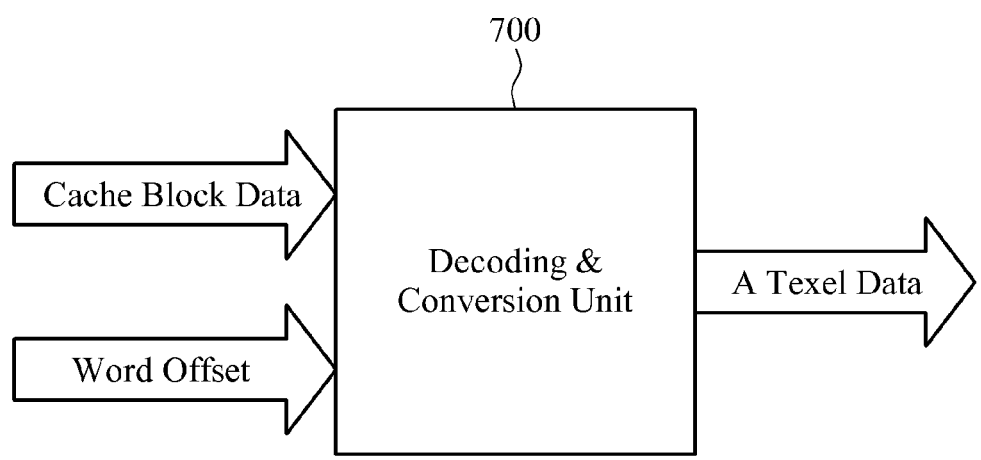
FIG. 7 illustrates a decoding and conversion unit, according to an example embodiment.

FIG. 7 illustrates a decoding and conversion unit 700, according to an example embodiment.

The decoding and conversion unit 700 may include a unit to support various pixel formats including compression of OpenGL in a non-blocking texture cache.

When storing texture data corresponding to each address in a waiting list buffer, cache block data read from a cache may be converted to a texel format and be stored using the decoding and conversion format 700.

The non-blocking texture cache, according to an example embodiment, may include two decoding and conversion units 700.

One decoding and conversion unit 700 may include a unit capable of storing a maximum of eight items of hit data, for example, in an entry of the waiting list buffer in order to process the maximum of eight items of hit data at a time in the case of a cache miss. The other decoding and conversion unit 700 may include a unit to process a single item of update data in the case of updating the waiting list buffer with cache block data read from a DRAM.

Since the non-blocking texture cache operates based on an in-order completion process, processing based on an out-of-order process occurring in a general non-blocking cache may not be considered. Also, even though a miss request is retried, it is possible to prevent degradation of performance from occurring due to retry by avoiding cache re-inquiry. Further, in the case of using the non-blocking texture cache, result data of a hit request may also be stored in a retry buffer and be referred to again, thereby enhancing the performance of the cache.

Figure 8:
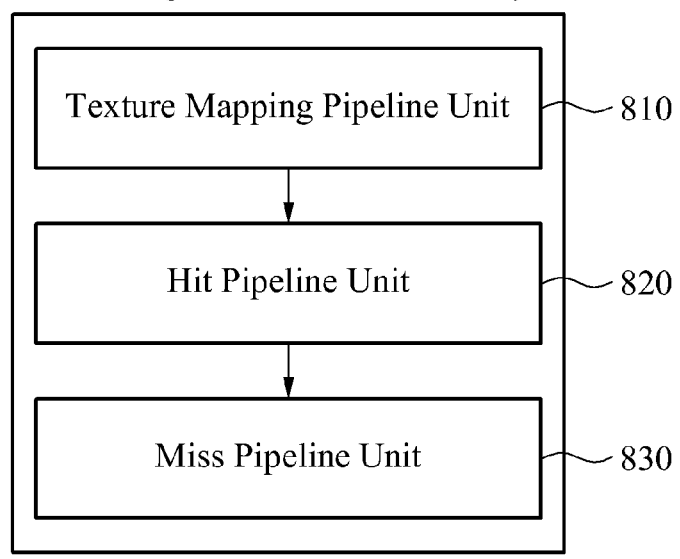
FIG. 8 illustrates a non-blocking texture cache memory, according to another example embodiment.

FIG. 8 illustrates a non-blocking texture cache memory 800, according to another example embodiment.

Referring to FIG. 8, the non-blocking texture cache memory 800 may include a texture mapping pipeline unit 810, a hit pipeline unit 820, and a miss pipeline unit 830.

The texture mapping pipeline unit 810 may look up a retry buffer when a texture request is input, and may transfer texture data to a shading unit when the lookup succeeds.

When the lookup fails, the hit pipeline unit 820 may process a hit pipeline using hit texture data, and may store the result of the hit pipeline in the retry buffer.

The miss pipeline unit 830 may request an external memory for missed texture data through a waiting list buffer, and may process a miss pipeline using the texture data transferred from the external memory and may store the result of the miss pipeline in the retry buffer.

To further quickly and efficiently read a texture map from the external memory is one of the most important matters to be considered in a graphics system. The non-blocking texture cache memory 800 may decrease an access time when reading a texture map using a texture cache.

To effectively process in-order completion while performing out-of-order completion, the non-blocking texture cache memory 800 may divide a pipeline into a hit pipeline and a miss pipeline after referring to the texture cache.

The hit pipeline unit 820 may process the hit pipeline, and the miss pipeline unit 830 may process the miss pipeline. For example, a hit request may be processed based on an in-order process using the hit pipeline unit 820. A miss request may be processed based on an out-of-order process using the miss pipeline unit 830.

The results that are processed in the hit pipeline unit 820 and the miss pipeline unit 830 may be stored in the retry buffer. The results stored in the retry buffer may be referred to again in an order, based on fragment ID information and texture request ID information.

Figure 9:
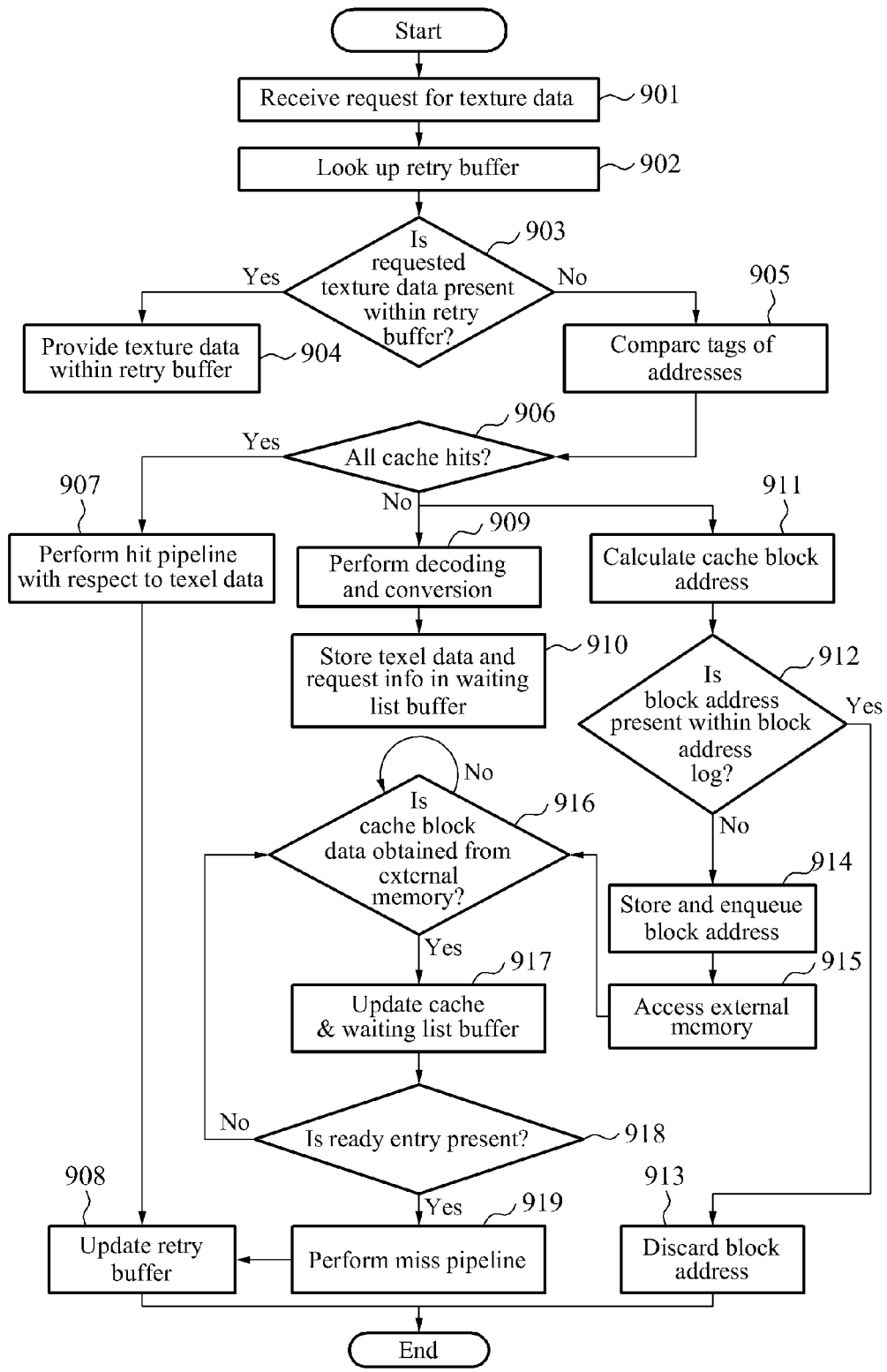
FIG. 9 is a flowchart illustrating an operation method of a non-blocking texture cache memory, according to an example embodiment.

FIG. 9 is a flowchart illustrating an operation method of a non-blocking texture cache memory, according to an example embodiment.

In operation 901, a request for texture data may be received from a processor. For example, as shown in FIG. 2, the processor may access the texture cache memory 200 in order to use texture data while performing an operation on input data.

In response to the request, a retry buffer may be looked up in operation 902.

A texture request may be transferred to a texture mapping pipeline based on a fragment unit. Texture requests belonging to a fragment may sequentially enter into a texture mapping pipeline and may perform a predetermined process. The most initially performed operation may be an operation of looking up the retry buffer.

In operation 903, whether texture data corresponding to a currently input texture request is present within the retry buffer may be verified.

When the texture data is present within the retry buffer, the texture mapping pipeline may not be performed with respect to the texture request. The texture request may be provided to a shading unit together with the corresponding texture data in operation 904, and be used to determine a final pixel color. For example, the shading unit may include a processor.

When the lookup fails, for example, when the texture data corresponding to the currently input texture request is absent within the retry buffer, operation 905 may be performed.

For example, when the lookup fails, tags of addresses according to the texture request may be compared in operation 905.

In response to the texture request, a texture address generating unit may generate a texture address. The generated texture address may be used for access to an L1 cache. Whether a cache miss or a cache hit has occurred may be determined through the tag comparison.

In operation 906, whether all of the texture addresses are the cache hit may be determined based on the comparison result.

When all of the texture addresses are determined as the cache hit in operation 906, a remaining processing process may be performed based on an in-order process through the hit pipeline with respect to texel data in operation 907.

However, when any one of the texture addresses is determined as the cache miss in operation 906, a hit address and a miss address may be identified using a hit/miss router.

By identifying the hit address and the miss address, decoding and conversion may be performed on the hit address in operation 909, and the miss address may be transmitted to a block address log to calculate a cache block address in operation 911.

With respect to the hit address that is decoded and converted in operation 909, texel data and request information may be stored in a waiting list buffer in operation 910.

Hit data transmitted to the decoding and conversion unit may be converted to a single texel format. Also, the converted texel data may be stored in the waiting list buffer as a single entry together with the hit address and texture request data.

Whether the received miss address is duplicated may be verified using the block address log. When the received miss address is duplicated, the duplicated miss address may be removed. For example, in the case of calculating the cache block address, whether a block address is present within the block address log may be determined in operation 912.

When the block address is determined to be present within the block address log in operation 912, the block address may be discarded in operation 913.

However, when the block address is absent within the block address log, and thus, a miss address is not currently being processed, the block address may be stored and be enqueued in a request address queue in order to request the external memory for texture data in operation 914. In operation 915, the external memory may be accessed using each block address.

In operation 916, whether cache block data is obtained from the external memory may be determined. When the cache block data is not obtained from the external memory, operation 916 may be repeated.

However, when the cache block data is obtained from the external memory, the cache and the waiting list buffer may be updated in operation 917.

For example, data read from an external memory, such as a DRAM, for example, may be updated to the L1 cache and the waiting list buffer. Hereinafter, a process of updating the waiting list buffer will be described. According to an example embodiment, a block address of each address stored in the waiting list buffer may be calculated. Whether the calculated block address and an address of data read from the DRAM match may be verified.

When the calculated block address and the address of the DRAM data match, the DRAM data may be transmitted to the decoding and conversion unit together with word offset, for example. Data converted to a texel format may be updated to an entry of the corresponding address. The above process may be performed with respect to all of the addresses stored in the waiting list buffer.

In operation 918, whether a ready entry is present among entries of the waiting list buffer after updating may be determined. For example, in operation 918, whether an entry of processing completed with respect to all of the miss addresses, for example, a ready entry is present may be verified.

When the ready entry is absent, whether cache block data is obtained from the external memory may be determined in operation 916.

However, when the ready entry is present, the miss pipeline may be performed with respect to the corresponding entry in operation 919. The corresponding entry may be transferred to the miss pipeline.

In operation 908, the retry buffer may be updated by performing stage out of the texture request of the transferred entry and by storing the result data according to the stage out in the retry buffer.

Similar to the miss pipeline, in the stage out of the texture mapping pipeline, result data may be updated to the retry buffer.

The operation method of the non-blocking texture cache memory according to embodiments may operate based on in-order completion, and thus, processing based on out-of-order completion occurring in a general non-blocking cache may not be considered. Also, although a miss request is retried, it is possible to prevent degradation of performance from occurring due to excessive retries by avoiding cache re-inquiry. Further, it is possible to enhance performance by storing result data of a hit request and by using the stored result data.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the systems or apparatuses discussed above may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A non-blocking texture cache memory configured by a processor, the non-blocking texture cache memory comprising:
    an in-order retry buffer configured to store result data for a previous texture request, according to a hit pipeline and a miss pipeline of the texture cache memory, in respective addresses of corresponding fragment ID information and texture request ID information of the retry buffer;
    a lookup retry buffer configured to look up the retry buffer in response to a new texture request and before a performing of a cache hit/miss determination of a local cache, storing texture data, based on a texture address corresponding to the new texture request;
    a verifier configured to verify whether result data corresponding to the new texture request is stored in the retry buffer;
    an output controller configured to output the stored result data when the verifier verifies that the result data corresponding to the new texture request is stored in the retry buffer; and
    a cache hit/miss determiner including the local cache storing texture data, the cache hit/miss determiner configured to, when the verifier verifies that the result data corresponding to the new texture request is not stored in the retry buffer, generate the texture address corresponding to the new texture request and then to perform a determining of the cache hit/miss determination of whether texture data is a cache hit or a cache miss in the local cache based on the generated texture address.

2. The texture cache memory of claim 1, wherein the hit pipeline is implemented when the texture data corresponding to the texture request is the cache hit, in the cache/hit miss determination, and the hit pipeline includes outputting, to the retry buffer, generated result data based on the texture data corresponding to the texture request.

3. The texture cache memory of claim 1, further comprising:
    a cache miss processor configured to collect cache missed texture data from an external L2 memory, and to output the collected cache missed texture data to the retry buffer when the texture data corresponding to the texture request is the cache miss.

4. The texture cache memory of claim 3, wherein the cache miss processor comprises a waiting list buffer configured to include an entry, and to store, in the entry, a texture request in which the cache miss occurs.

5. The texture cache memory of claim 4, wherein when processing of the texture request stored in the entry is completed, the waiting list buffer changes a state of the processing completed entry to a ready state and transmits the processed entry to a miss pipeline.

6. The texture cache memory of claim 4, wherein the entry comprises at least one of a valid bit, a ready bit, texel data corresponding to each of addresses, and miss request data.

7. The texture cache memory of claim 3, wherein the cache miss processor comprises a block address logger configured to verify whether an address requested to an external memory and being processed is present among miss addresses.

8. The texture cache memory of claim 7, wherein when the address requested to the external memory and being processed is absent, the block address log unit stores the received miss address and enqueues the miss address to request the external memory for the miss address.

9. The texture cache memory of claim 3, wherein the cache miss processing unit comprises a miss pipeline unit configured to provide a duplication function of a hit pipeline executed when an entry of a waiting list buffer is in a ready state.

10. The texture cache memory of claim 9, wherein the miss pipeline unit stores texture data to be output in the retry buffer, based on the fragment identification information and the texture request identification information.

11. The texture cache memory of claim 1, wherein the cache hit/miss determiner is configured to comprise:
a texture address generator configured to generate a texture address;
an L1 cache configured to store a cache of an lower level of a mipmap and a higher level of a mipmap; and
a hit/miss router configured to transfer outputs from the L1 cache.

12. The texture cache memory of claim 1, wherein the texture request comprises a batch to access the texture cache using one to eight addresses.

13. The texture cache memory of claim 1, wherein, when the verifier determines that result data corresponding to the new texture request is stored in the retry buffer, the output controller outputs corresponding texture data without the cache hit/miss determiner generating a texture address for the new texture request.

14. The texture cache memory of claim 1, wherein the hit pipeline is implemented when the cache hit is determined and includes outputting texture data corresponding to the cache hit and the retry buffer.

15. The non-blocking texture cache memory of claim 14, wherein, when the verifier determines that result data corresponding to a new texture request is stored in the retry buffer the output controller outputs corresponding texture data for the new texture request without the cache hit/miss determiner generating a texture address for the new texture request.

16. An operation method of a non-blocking texture cache memory, the method comprising:
temporarily storing, by an in-order retry buffer, result data according to a hit pipeline and a miss pipeline of the texture cache memory;
looking up, by a lookup retry buffer, the retry buffer in response to a texture request transferred by a processor;
verifying, by a verification unit, whether result data corresponding to the texture request is stored in the retry buffer,
when the result data corresponding to the texture request is stored in the retry buffer, an output controller outputting the stored result data to the processor, and
when the result data corresponding to the texture request is not stored in the retry buffer:
generate a texture address for the texture request and compare tags of texture addresses according to the generated texture address, and determine whether texture data corresponding to the texture request is a cache hit or a cache miss in a local cache based on the compared tags; and
determine whether all of the texture addresses are a cache hit,
when all of the texture addresses are a cache hit, perform an in-order process through the hit pipeline with respect to texel data, and
when any one of the texture addresses is determined as a cache miss, a hit address and a miss address are identified using a hit/miss router by identifying the hit address and the miss address, a decoding and converting of the hit address is performed, and the miss address is transmitted to a block address log to calculate a cache block address.

17. The method of claim 16, further comprising:
performing a predetermined operation using a predetermined algorithm, and outputting generated result data to the retry buffer when the texture data corresponding to the texture request is the cache hit.

18. The method of claim 16, further comprising:
collecting cache missed texture data from an external memory, and outputting the collected cache missed texture data to the retry buffer when the texture data corresponding to the texture request is the cache miss.

19. A non-transitory computer-readable recording medium storing a program to implement the method of claim 16.

* * * * *